United States Patent
Jin (10) Patent No.: US 9,135,009 B2
(45) Date of Patent: Sep. 15, 2015

(54) APPARATUS AND METHOD FOR COMPRESSING INSTRUCTIONS AND A COMPUTER-READABLE STORAGE MEDIA THEREFOR

(75) Inventor: Tai-Song Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 13/595,198

(22) Filed: Aug. 27, 2012

(65) Prior Publication Data

US 2013/0067207 A1 Mar. 14, 2013

(30) Foreign Application Priority Data

Sep. 8, 2011 (KR) .................. 10-2011-0091343

(51) Int. Cl.
*G06F 9/38* (2006.01)
*G06F 9/30* (2006.01)
*G06F 9/00* (2006.01)

(52) U.S. Cl.
CPC .......... *G06F 9/30178* (2013.01); *G06F 9/3822* (2013.01)

(58) Field of Classification Search
None
See application file for complete search history.

(56) References Cited

U.S. PATENT DOCUMENTS

| | | | |
|---|---|---|---|
| 6,275,921 | B1 | 8/2001 | Iwata et al. |
| 6,799,266 | B1 | 9/2004 | Stotzer et al. |
| 7,124,279 | B2 | 10/2006 | Topham |
| 7,774,581 | B2 | 8/2010 | Baek et al. |
| 2010/0088536 | A1* | 4/2010 | Lee et al. ............ 713/502 |

FOREIGN PATENT DOCUMENTS

KR 10-2008-0086739 9/2008

* cited by examiner

*Primary Examiner* — Scott Sun
(74) *Attorney, Agent, or Firm* — NSIP Law (57) ABSTRACT

Provided is a technique that is capable of efficiently compressing instructions by inserting instruction compression bits into valid instruction bundles and deleting no operation (NOP) instruction bundles. Accordingly, the number of instructions that can be parallel-processed in a processor may be increased.

18 Claims, 14 Drawing Sheets

| A | 0 | nop | 0 |
|---|---|---|---|
| nop | 1 | B | 1 |
| nop |   | nop |   |
| nop |   | nop |   |
| nop |   | nop |   |
| C | 0 | nop | 0 |
| D | 0 | E | 0 |
| F | 1 | G | 0 |
| nop |   | nop |   |
| nop |   | nop |   |
| nop | 0 | H | 1 |
| nop |   | nop |   |
| I | 0 | nop | 0 |
| J | 1 | K | 0 |
| nop |   | nop |   |
| nop |   | nop |   |

(a)

| A | nop | 0 | 0 |
|---|---|---|---|
| nop | B | 1 | 1 |
| nop | nop |   |   |
| nop | nop |   |   |
| nop | nop |   |   |
| C | nop | 0 | 0 |
| D | E | 0 | 0 |
| F | G | 1 | 0 |
| nop | nop |   |   |
| nop | nop |   |   |
| nop | H | 0 | 1 |
| nop | nop |   |   |
| I | nop | 0 | 0 |
| J | K | 1 | 0 |
| nop | nop |   |   |
| nop | nop |   |   |

| A | nop | nop | B | nop | nop | nop | nop | nop | nop | C | nop | D | E | F | G |
|---|---|---|---|---|---|---|---|---|---|---|---|---|---|---|---|
| nop | nop | nop | nop | nop | H | nop | nop | I | nop | J | K | nop | nop | nop | nop |

| | | |
|---|---|---|
| 210 | A | nop | 1cycle
| 211 | nop | B | 2cycle
| 212 | nop | nop | .
| 213 | nop | nop | .
| 214 | nop | nop | .
| 215 | C | nop | .
| 216 | D | E | .
| 217 | F | G | .
| 218 | nop | nop | .
| 219 | nop | nop | .
| 220 | nop | H | .
| 221 | nop | nop | .
| 222 | I | nop | .
| 223 | J | K | .
| 224 | nop | nop | .
| 225 | nop | nop | 16cycle

FIG. 2C

| INSTRUCTION COMPRESSION BITS | THE NUMBER OF NOP INSTRUCTION BUNDLES THAT EXIST BETWEEN VALID INSTRUCTION BUNDLES |
|---|---|
| 00 | 0 |
| 01 | 1 |
| 10 | 2 |
| 11 | 3 |

| A | 0 | nop | 0 |
|---|---|-----|---|
| nop | 1 | B | 1 |
| nop | | nop | |
| nop | | nop | |
| nop | | nop | |
| C | 0 | nop | 0 |
| D | 0 | E | 0 |
| F | 1 | G | 0 |
| nop | | nop | |
| nop | | nop | |
| nop | 0 | H | 1 |
| nop | | nop | |
| I | 0 | nop | 0 |
| J | 1 | K | 0 |
| nop | | nop | |
| nop | | nop | |

(a)

| A | nop | 0 | 0 |
|---|-----|---|---|
| nop | B | 1 | 1 |
| nop | nop | | |
| nop | nop | | |
| nop | nop | | |
| C | nop | 0 | 0 |
| D | E | 0 | 0 |
| F | G | 1 | 0 |
| nop | nop | | |
| nop | nop | | |
| nop | H | 0 | 1 |
| nop | nop | | |
| I | nop | 0 | 0 |
| J | K | 1 | 0 |
| nop | nop | | |
| nop | nop | | |

| A | 0 | nop | 0 |
|---|---|-----|---|
| nop | 1 | B | 1 |
| C | 0 | nop | 0 |
| D | 0 | E | 0 |
| F | 1 | G | 0 |
| nop | 0 | H | 1 |
| I | 0 | nop | 0 |
| J | 1 | K | 0 |

(a)

| A | nop | 0 | 0 |
|---|-----|---|---|
| nop | B | 1 | 1 |
| C | nop | 0 | 0 |
| D | E | 0 | 0 |
| F | G | 1 | 0 |
| nop | H | 0 | 1 |
| I | nop | 0 | 0 |
| J | K | 1 | 0 |

| | | | | |
|---|---|---|---|---|
| 310 | A | nop | nop | B | 1cycle
| 311 | nop | nop | nop | nop | 2cycle
| 312 | nop | nop | C | nop | ·
| 313 | nop | nop | nop | nop | ·
| 314 | nop | nop | nop | nop | ·
| 315 | nop | nop | nop | nop | ·
| 316 | D | E | F | G | ·
| 317 | nop | nop | nop | nop | 8cycle

FIG. 3C

| INSTRUCTION COMPRESSION BITS | THE NUMBER OF NOP INSTRUCTION BUNDLES THAT EXIST BETWEEN VALID INSTRUCTION BUNDLES |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

| A | 0 | nop | 0 | nop | 0 | B | 1 |
|---|---|-----|---|-----|---|---|---|
| nop | | nop | | nop | | nop | |
| nop | 0 | nop | 0 | C | 1 | nop | 1 |
| nop | | nop | | nop | | nop | |
| nop | | nop | | nop | | nop | |
| nop | | nop | | nop | | nop | |
| D | 0 | E | 0 | F | 0 | G | 1 |
| nop | | nop | | nop | | nop | |

FIG. 3F

| A | 0 | nop | 0 | nop | 0 | B | 1 |
|---|---|-----|---|-----|---|---|---|
| nop | 0 | nop | 0 | C | 1 | nop | 1 |
| D | 0 | E | 0 | F | 0 | G | 1 |

FIG. 4

APPARATUS AND METHOD FOR COMPRESSING INSTRUCTIONS AND A COMPUTER-READABLE STORAGE MEDIA THEREFOR

CROSS-REFERENCE TO RELATED APPLICATION(S)

This application claims the benefit under 35 U.S.C. §119(a) of Korean Patent Application No. 10-2011-0091343, filed on Sep. 8, 2011, in the Korean Intellectual Property Office, the entire disclosure of which is incorporated herein by reference for all purposes.

BACKGROUND

1. Field

The following description relates to a technique for compressing a plurality of instructions.

2. Description of the Related Art

A processor typically includes a plurality of functional units (FUs) that are used to process a plurality of instructions in parallel or simultaneously. The processor may reduce a processing time for instructions by parallel-processing the instructions using the FUs.

The number of instructions that can be parallel-processed in a processor depends on the number of FUs. For example, if there are four FUs, a maximum of four instructions can be processed simultaneously.

For example, a valid instruction is an instruction for executing a predetermined operation. Meanwhile, a no operation (NOP) instruction is for executing no operation and may exist between valid instructions. A compiler included in a processor has to encode NOP operations as well as valid instructions in order to allocate all instructions to the FUs. However, encoding unnecessary NOP operations that have little or no influence on an operation increases the processing load. The increase in the number of instructions that should be encoded also increases the code size, which requires complicated hardware and increases the overhead upon processing of instructions.

Accordingly, there is a need for a technique that efficiently compresses instructions in order for a processor to more efficiently process the instructions.

SUMMARY

In one general aspect, there is provided an instruction compression apparatus including a dividing unit configured to divide a plurality of instructions into a plurality of valid instruction bundles that each include at least one valid instruction, and a plurality of no operation (NOP) instruction bundles that each include at least one NOP instruction, a creating unit configured to create instruction compression bits corresponding to the number of NOP instruction bundles that exist between a valid instruction bundle and a next valid instruction bundle, and an inserting unit configured to insert the instruction compression bits into the valid instruction bundle.

The amount of instruction compression bits may be equal to the number of instructions included in the valid instruction bundle.

The inserting unit may be configured to add the instruction compression bits, bit-by-bit, to individual instructions included in the valid instruction bundle.

The dividing unit may be configured to group the plurality of instructions into a plurality of instruction bundles that each consist of instructions that are parallel-processed, and classify the instruction bundles into the valid instruction bundles and the NOP instruction bundles.

The instruction compression apparatus may further comprise a deleting unit configured to delete the NOP instruction bundles.

The valid instruction may be an instruction for executing a predetermined operation, and the NOP instruction may be an instruction for executing no operation.

In another aspect, there is provided an instruction compression method including dividing a plurality of instructions into a plurality of valid instruction bundles that each include at least one valid instruction, and a plurality of no operation (NOP) instruction bundles that each include at least one NOP instruction, creating instruction compression bits corresponding to the number of NOP instruction bundles that exist between a valid instruction bundle and a next valid instruction bundle, and inserting the instruction compression bits into the valid instruction bundle.

The amount of instruction compression bits may be equal to the number of instructions included in the valid instruction bundle.

The inserting of the instruction compression bits may comprise adding the instruction compression bits, bit-by-bit, to individual instructions included in the valid instruction bundle.

The dividing of the instructions may comprise grouping the plurality of instructions into a plurality of instruction bundles that each consists of instructions that are parallel-processed, and classifying the instruction bundles into the valid instruction bundles and the NOP instruction bundles.

The instruction compression method may further comprise deleting the NOP instruction bundles.

The valid instruction may be an instruction for executing a predetermined operation, and the NOP instruction may be an instruction for executing no operation.

In another aspect, there is provided a computer-readable storage medium storing a program for executing an instruction compression method including dividing a plurality of instructions into a plurality of valid instruction bundles that each include at least one valid instruction, and a plurality of no operation (NOP) instruction bundles that each include at least one NOP instruction, creating instruction compression bits corresponding to the number of NOP instruction bundles that exist between a valid instruction bundle and a next valid instruction bundle, and inserting the instruction compression bits into the valid instruction bundle.

In another aspect, there is provided a processor that reduces an amount of instructions included in a plurality of instructions that are to be processed, the processor including an inserting unit configured to insert an instruction compression bit value into a valid instruction bundle, the instruction compression bit value corresponding to an amount of no operation (NOP) instruction bundles included between the valid instruction bundle and a next valid instruction bundle of the plurality of instructions, and a deleting unit configured to delete the NOP instruction bundles from the plurality of instructions.

The inserting unit may be configured to insert the instruction compression bit value at a beginning of the valid instruction bundle, an end of the valid instruction bundle, or in between individual instructions included in the valid instruction bundle.

The processor may further comprise a plurality of processing units configured to process the plurality of instructions with the NOP instructions bundles removed.

The processor may further comprise a dividing unit configured to divide the plurality of instructions into a plurality of valid instruction bundles that each include at least one valid instruction, and a plurality of no operation (NOP) instruction bundles that each include at least one NOP instruction.

The processor may further comprise a creating unit configured to create the instruction compression bit value corresponding to the number of NOP instruction bundles that exist between the valid instruction bundle and the next valid instruction bundle Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
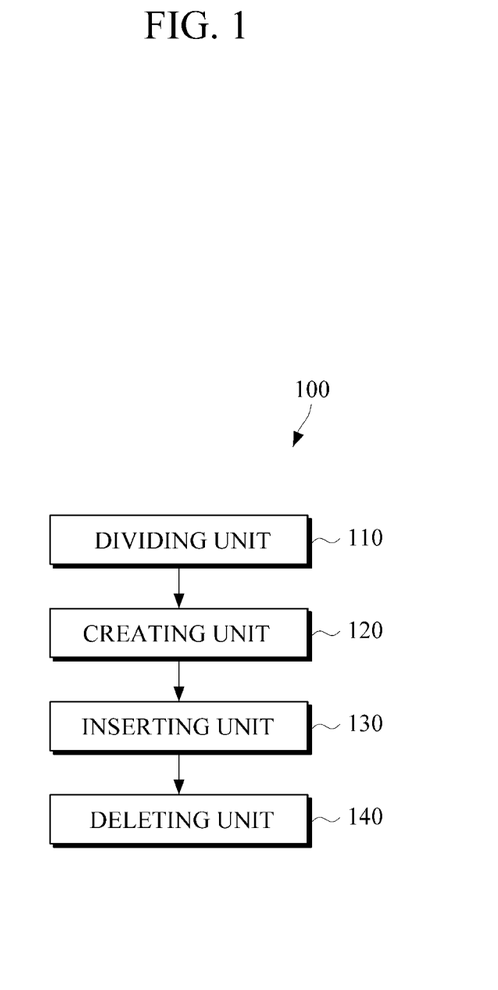
FIG. 1 is a diagram illustrating an example of an instruction compression apparatus.

FIG. 1 illustrates an example of an instruction compression apparatus.

Referring to FIG. 1, instruction compression apparatus 100 includes a dividing unit 110, a creating unit 120, an inserting unit 130, and a deleting unit 140. The instruction compression apparatus 100 may be included in a processor. The processor may be included in a terminal. For example, the terminal may be a smart phone, a tablet, a computer, a television, an appliance, and the like. The processor may include a plurality of processing units for processing instructions.

The dividing unit 110 may divide instructions into valid instruction bundles and no operation (NOP) instruction bundles. As an example, the instructions may be very long instruction word (VLIW) instructions that are executed in a VLIW processor. An instruction bundle may consist of two or more instructions that are simultaneously processed in one cycle, that is, in parallel. For example, if a processor includes four functional units (FUs), the number of instructions that can be parallel-processed is four. In this example, an instruction bundle may consist of four instructions.

The valid instruction bundle includes at least one valid instruction, and the NOP instruction bundle includes one or more NOP instructions. The valid instruction is an instruction for executing a predetermined operation, and the NOP instruction is an instruction for executing no operation. The dividing unit 110 may group instructions into instruction bundles and classify the instruction bundles into valid instruction bundles and NOP instruction bundles.

The creating unit 120 may create instruction compression bits that correspond to the number of NOP instruction bundles that exist between two valid instruction bundles. For example, if the number of NOP instruction bundles that exist between two valid instruction bundles is "0," the creating unit 120 may create instruction compression bits "00." As another example, if the number of NOP instruction bundles that exist between two valid instruction bundles is "1," the creating unit 120 may create instruction compression bits "01."

Similarly, the number of instruction compression bits may be equal to the number or the amount of instructions included in a valid instruction bundle. For example, if the amount of instructions included in a valid instruction bundle is two, the creating unit 120 may create two bits as instruction compression bits. As another example, if the amount of instructions included in a valid instruction bundle is four, the creating unit 120 may create four bits as instruction compression bits.

The inserting unit 130 may insert the instruction compression bits into the corresponding valid instruction bundle. For example, the inserting unit 130 may respectively insert the instruction compression bits into individual instructions that are included in the corresponding valid instruction bundle. As another example, the inserting unit 130 may insert the instruction compression bits to the beginning or end of a valid instruction bundle.

The deleting unit 140 may delete the NOP instruction bundles thereby reducing the number of instructions that are executed by a processor.

The instruction compression apparatus 100 may efficiently compress instructions by inserting instruction compression bits corresponding to NOP instructions into valid instruction bundles and deleting NOP instruction bundles.

Furthermore, the instruction compression apparatus 100 may compress instructions in units of instruction bundles, thereby contributing to simplification of hardware for decompression, simplification of address calculation, and the like.

Furthermore, the instruction compression apparatus 100 may create and use instruction compression bits that correspond to the number of instructions, thereby reducing the length of instructions. In this example, an instruction compression bit may be inserted into each instruction included in an instruction bundle.

Furthermore, the instruction compression apparatus 100 may delete NOP instruction bundles, thereby effectively compressing instructions.

FIGS. 2A through 2F illustrate examples of a process in which instructions are compressed.

Figure 2A:
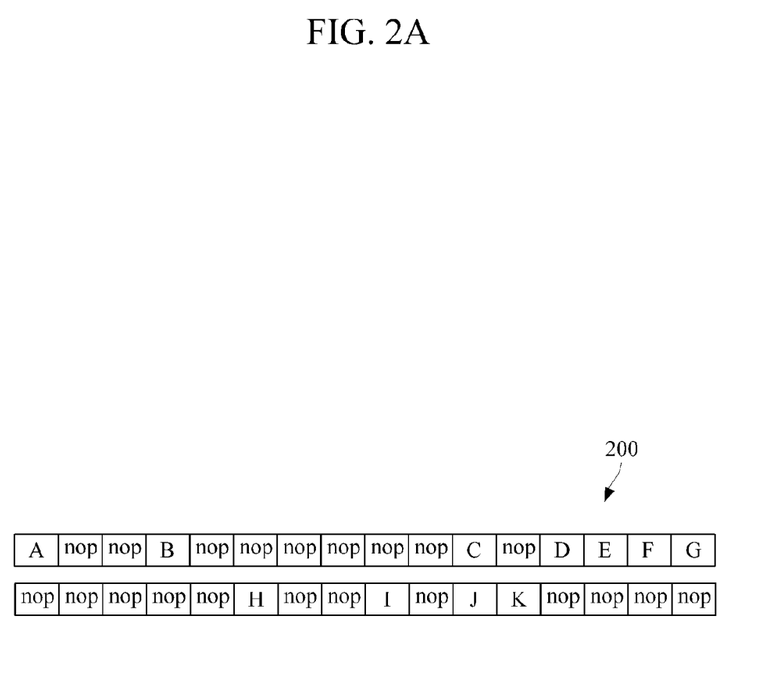
FIGS. 2A through 2F are diagrams illustrating examples of a process in which instructions are compressed.

Referring to FIGS. 1 and 2A, in this example there are 32 instructions 200, however, it should be appreciated that the number of instructions is not limited to 32. In the following description, it is assumed that there are two FUs for processing instructions. Accordingly, the number of instructions that may be parallel-processed in one cycle is two, and an instruction bundle consists of two instructions.

Figure 2B:
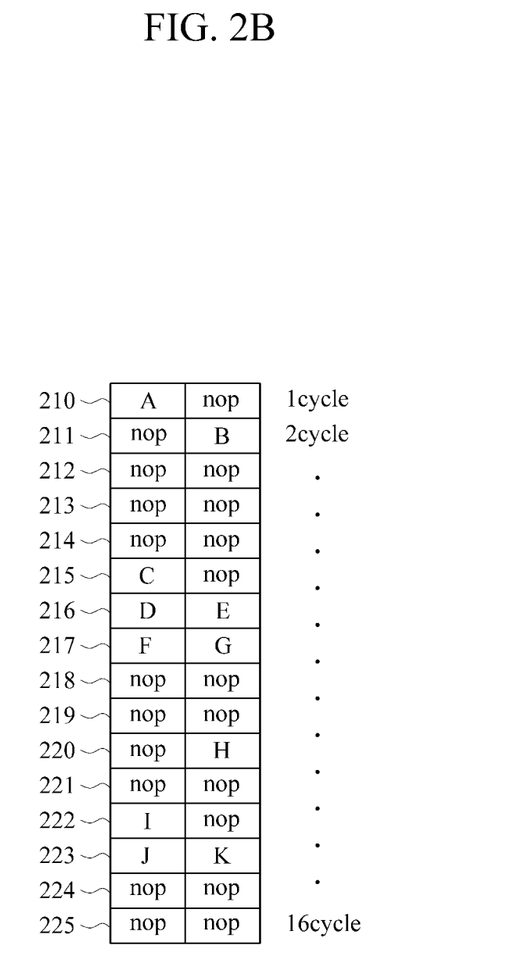

For example, the instruction compression apparatus 100 may divide the instructions 200 in units of instruction bundles, as illustrated in FIG. 2B.

Referring to FIGS. 1 and 2B, the instruction compression apparatus 100 may divide the instructions (200 of FIG. 2A) into valid instruction bundles and NOP instruction bundles. For example, the instruction compression apparatus 100 may classify instruction bundles 210, 211, 215, 216, 217, 220, 222, and 223 which each include at least one valid instruction such as instructions A, B, C, D, E, F, G, H, I, J, and K, into valid instruction bundles. Furthermore, the instruction compression apparatus 100 may classify the instruction bundles 212, 213, 214, 218, 219, 221, 224, and 225 which each include only NOP instructions, into NOP instruction bundles.

Figure 2C:
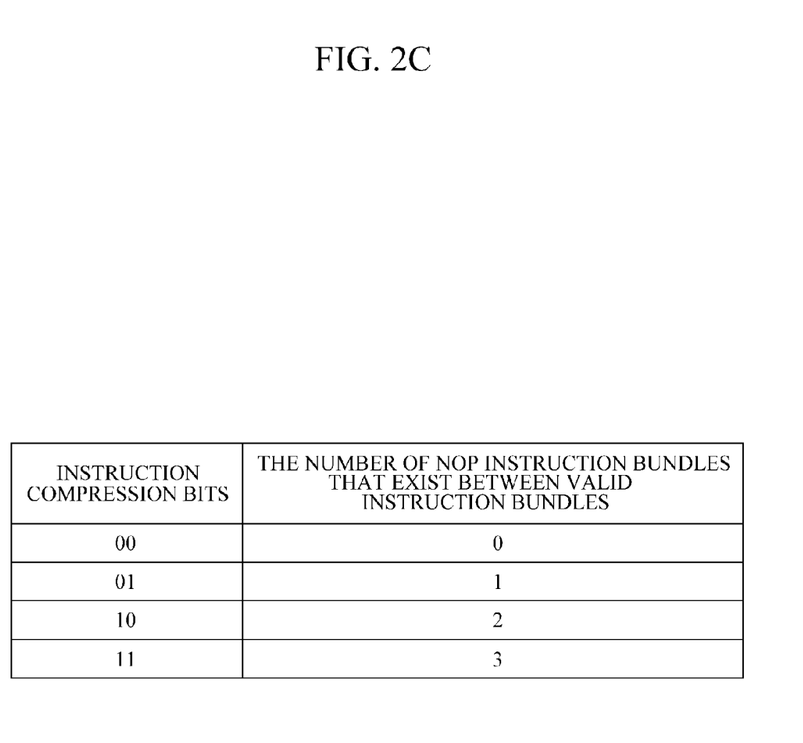

Referring to FIG. 2C, in this example, the amount of instruction compression bits is two which is equal to the number of instructions included in a valid instruction bundle. For example, if the number of NOP instruction bundles that exist between two valid instruction bundles is "0," instruction compression bits may be represented by two instruction compression bits as "00," if the number of NOP instruction bundles that exist between two valid instruction bundles is "1," instruction compression bits may be represented as "01," if the number of NOP instruction bundles that exist between two valid instruction bundles is "2," instruction compression bits may be represented as "10," and if the number of NOP instruction bundles that exist between two valid instruction bundles is "3," instruction compression bits may be represented as "11."

Figure 2D:
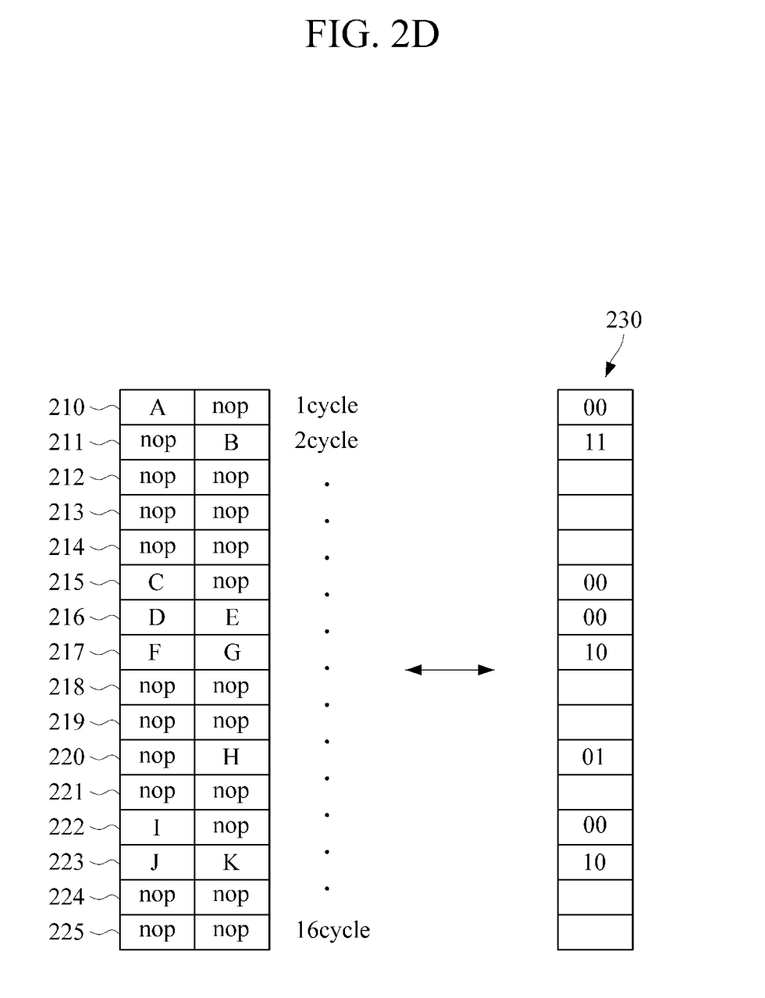

Referring to FIG. 2D, the instruction compression apparatus 100 may create instruction compression bits that correspond to the number of NOP instructions that exist between two valid instruction bundles, based on a table shown in FIG. 2C.

For example, the instruction compression apparatus 100 may create instruction compression bits "00" with respect to the first valid instruction bundle 210 because there does not exist an NOP instruction bundle between the first and second valid instruction bundles 210 and 211.

The instruction compression apparatus 100 may create instruction compression bits "11" with respect to the second valid instruction bundle 211 because there are three NOP instruction bundles between the second and third valid instruction bundles 211 and 215.

The instruction compression apparatus 100 may create instruction compression bits "00" with respect to the third valid instruction bundle 215 because there does not exist an NOP instruction bundle between the third and fourth valid instruction bundles 215 and 216.

The instruction compression apparatus 100 may create instruction compression bits "00" with respect to the fourth valid instruction bundle 216 because there does not exist an NOP instruction bundle between the fourth and fifth valid instruction bundles 216 and 217. Accordingly, the instruction compression apparatus 100 may create instruction compression bits 230 with respect to all valid instruction bundles.

Likewise, the instruction compression apparatus 100 may create instruction compression bits "10" with respect to the eighth valid instruction bundle 223 because there are two NOP instruction bundles after the eight valid instruction bundle 223.

Figure 2E:
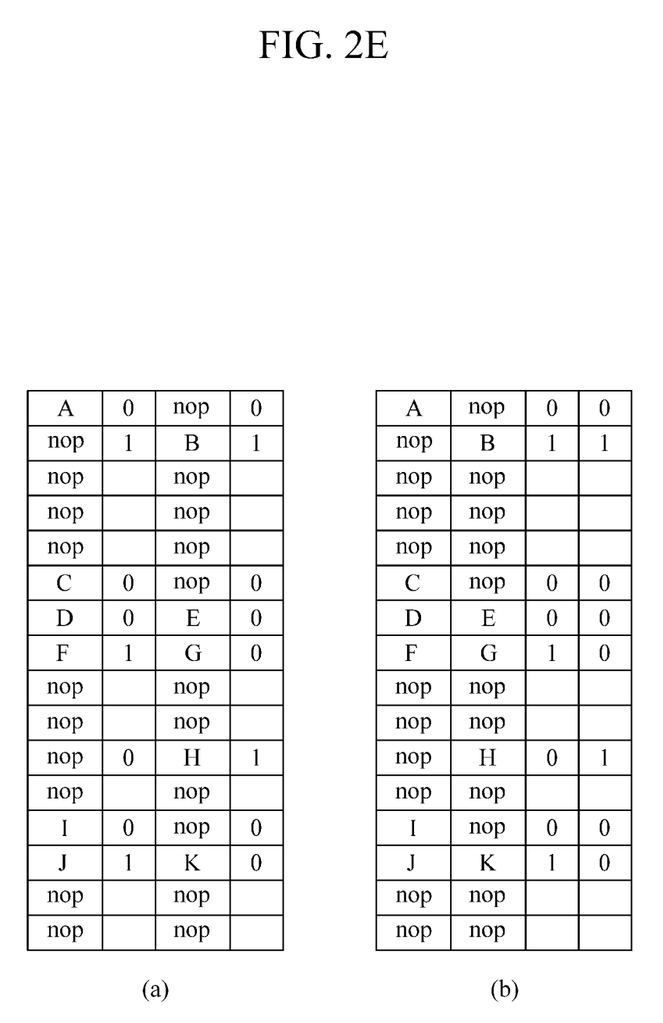

Referring to FIGS. 1, 2D, and 2E, the instruction compression apparatus 100 may insert the created instruction compression bits 230 into the valid instruction bundles 210, 211, 215, 216, 217, 220, 222, and 223, respectively. For example, referring to (a) of FIG. 2E, the instruction compression apparatus 100 may add the instruction compression bits on a bit-by-bit basis to the individual instructions included in the corresponding one of the valid instruction bundles 210, 211, 215, 216, 217, 220, 222, and 223. As another example, referring to (b) of FIG. 2E, the instruction compression apparatus 100 may add the instruction compression bits to the end of the corresponding one of the valid instruction bundles 210, 211, 215, 216, 217, 220, 222, and 223. As another example that is not shown, the instruction compression apparatus 100 may add the instruction compression bits to the beginning of the corresponding one of the valid instruction bundles 210, 211, 215, 216, 217, 220, 222, and 223.

Figure 2F:
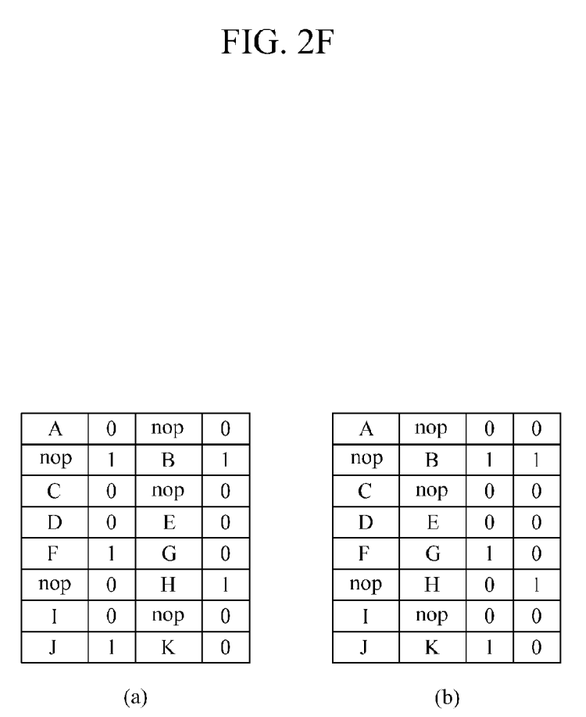

Referring to FIGS. 1, 2E, and 2F, the instruction compression apparatus 100 may delete the NOP instruction bundles. For example, referring to (a) and (b) of FIG. 2F, the instruction compression apparatus 100 may delete the NOP instruction bundles from the instruction bundles shown in (a) and (b) of FIG. 2E. In this example, the instruction compression apparatus 100 deletes eight NOP instruction bundles, thereby deleting a total of sixteen NOP instructions.

A decompressor (not shown) can detect the number of NOP instruction bundles that exist between valid instruction bundles, based on the instruction compression bits. That is, the instruction compression apparatus 100 may insert instruction compression bits into valid instruction bundles and deletes NOP instruction bundles, thereby efficiently compressing instructions.

In the example of FIG. 2A-2F, as a result of the deletion of the NOP instructions, the processor only processes 8 bundles of instructions instead of 16 bundles of instructions.

FIGS. 3A through 3F illustrate additional examples of a process in which instructions are compressed.

Figure 3A:
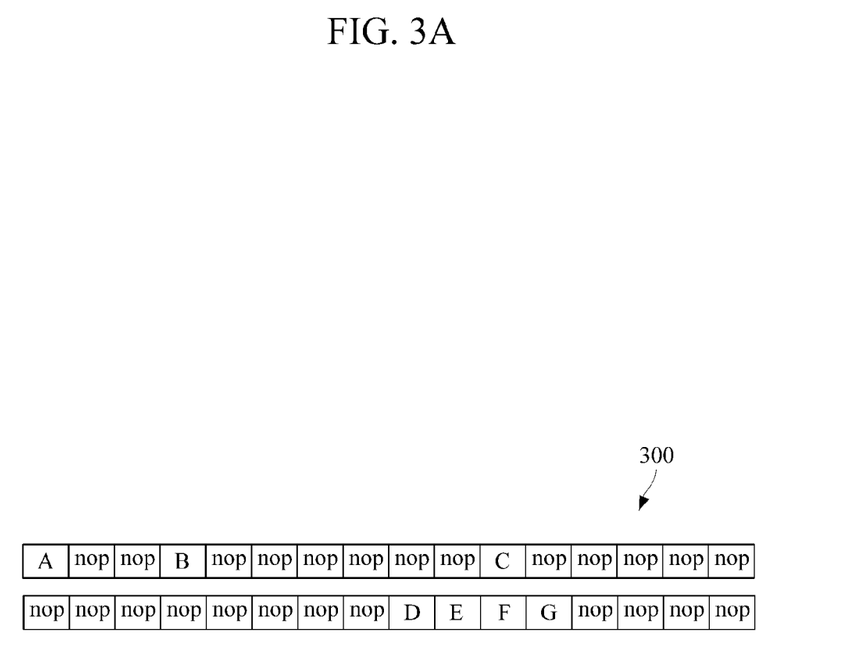
FIGS. 3A through 3F are diagrams illustrating additional examples of a process in which instructions are compressed.

Referring to FIGS. 1 and 3A, there are 32 instructions 300, however, the number of instructions is not limited to 32. In this example, it is assumed that there are four FUs for processing instructions. Accordingly, the number of instructions that may be parallel-processed in one cycle is four, and an instruction bundle consists of four instructions.

Figure 3B:
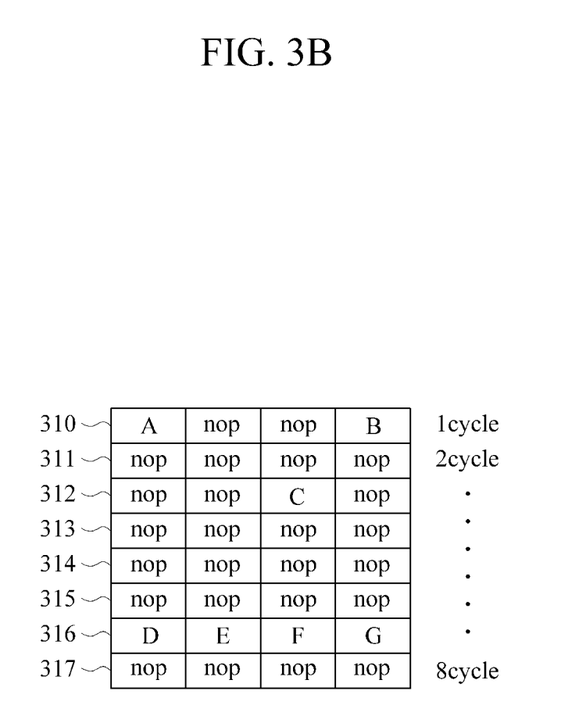

The instruction compression apparatus 100 may divide the instructions 300 in units of instruction bundles, as illustrated in FIG. 3B.

Referring to FIGS. 1 and 3B, the instruction compression apparatus 100 may divide instructions into valid instruction bundles and NOP instruction bundles. In this example, the instruction compression apparatus 100 may classify instruction bundles 310, 312, and 316 which each include at least one valid instruction such as instructions A, B, C, D, E, F, and G, into instruction bundles. The instruction compression apparatus 100 may classify instruction bundles 311, 313, 314, 315, and 317 which each include only NOP instructions, into NOP instruction bundles.

Figure 3C:
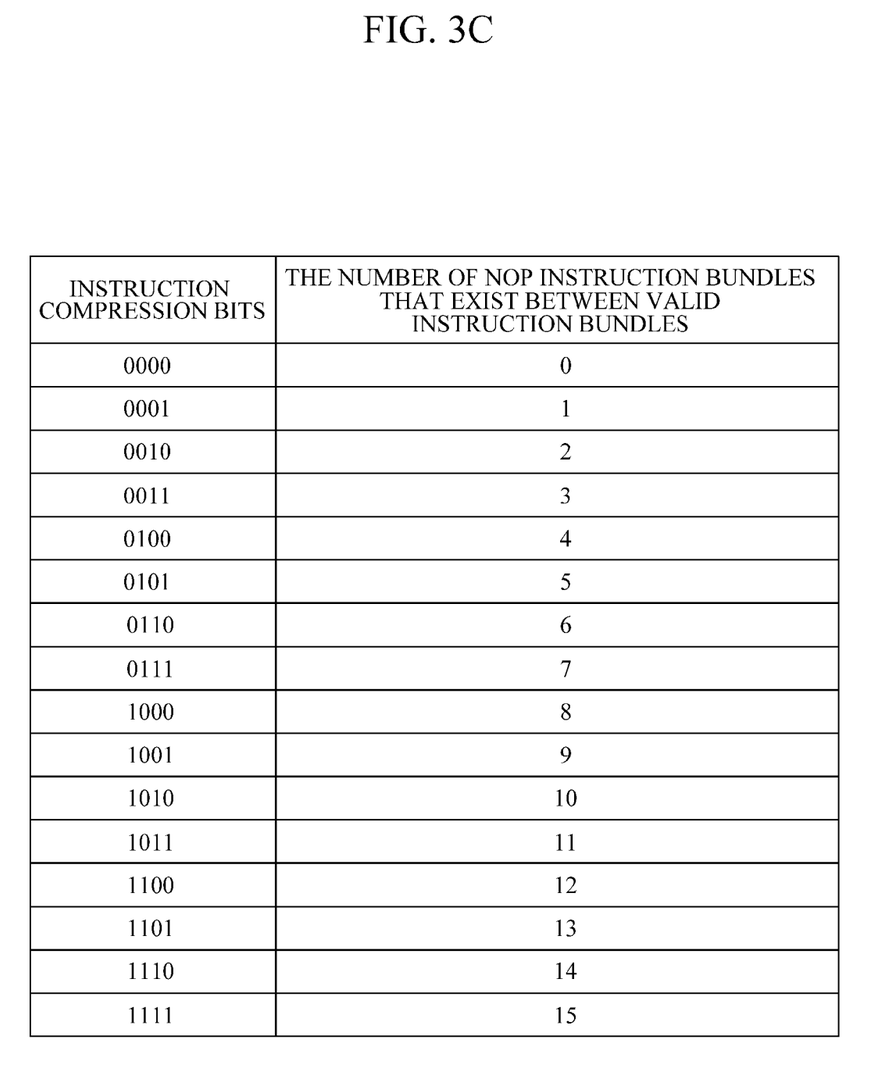

Referring to FIGS. 1 and 3C, the amount of instruction compression bits is four which is equal to the number of instructions included in a valid instruction bundle. For example, if the number of valid instruction bundles that exist between two valid instruction bundles is "0," the instruction compression bits may be represented by four bits as "0000." If the number of valid instruction bundles that exist between two valid instruction bundles is "1", instruction compression bits may be represented as "0001". If the number of valid instruction bundles that exist between two valid instruction bundles is "2", instruction compression bits may be represented as "0010". If the number of valid instruction bundles that exist between two valid instruction bundles is "3", instruction compression bits may be represented as "0011". In this way, the numbers "4" through "16" of NOP instruction bundles that exist between valid instruction bundles may also be represented as instruction compression bits "0100" through "1111", respectively.

Figure 3D:
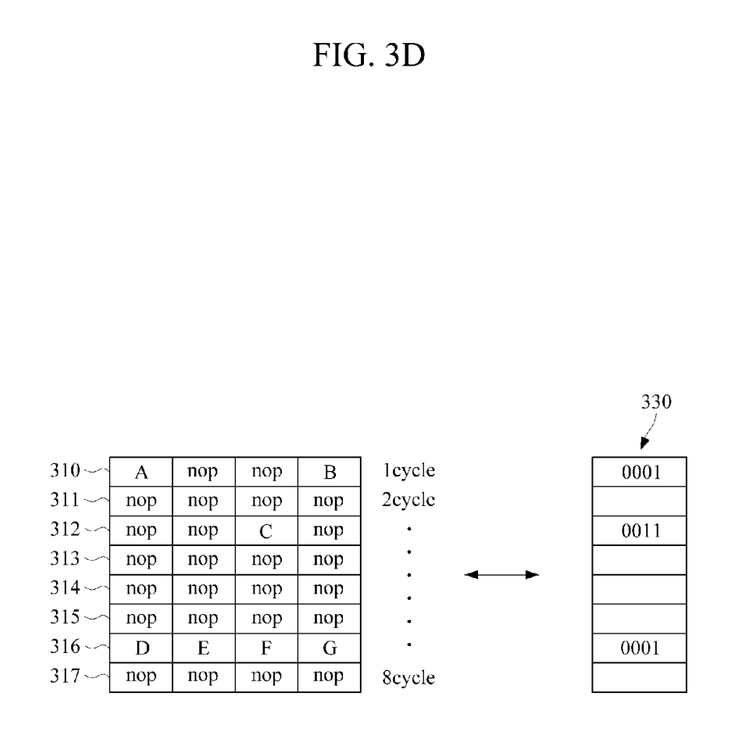

Referring to FIGS. 1 and 3D, the instruction compression apparatus 100 may create instruction compression bits that correspond to the number of NOP instruction bundles that exist between valid instruction bundles, based on a table as shown in FIG. 3C.

For example, the instruction compression apparatus 100 may create instruction compression bits "0001" with respect to the first valid instruction bundle 310 because there is one NOP instruction bundle that exists between the first and second valid instruction bundles 310 and 312.

The instruction compression apparatus 100 may create instruction compression bits "0011" with respect to the second valid instruction bundle 312 because there are three NOP instruction bundles that exist between the second and third valid instruction bundles 312 and 316.

The instruction compression apparatus 100 may create instruction compression bits "0001" with respect to the third valid instruction bundle 316 because there is one NOP instruction bundle that exists after the third valid instruction bundle 316. Accordingly, the instruction compression apparatus 100 may create instruction compression bits 330.

Figure 3E:
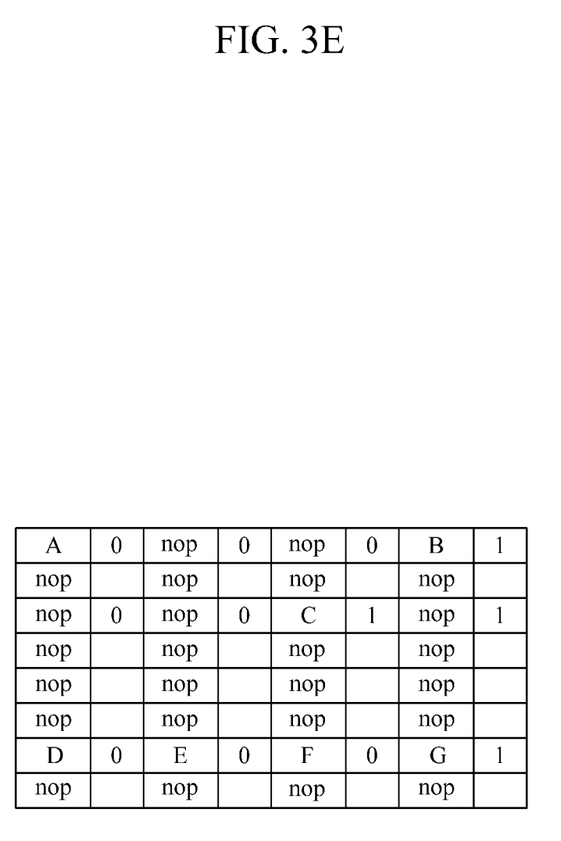

Referring to FIGS. 1, 3D, and 3E, the instruction compression apparatus 100 may add the instruction compression bits 330 on a bit-by-bit basis to the individual instructions included in the valid instruction bundles 310, 312, and 316.

Figure 3F:
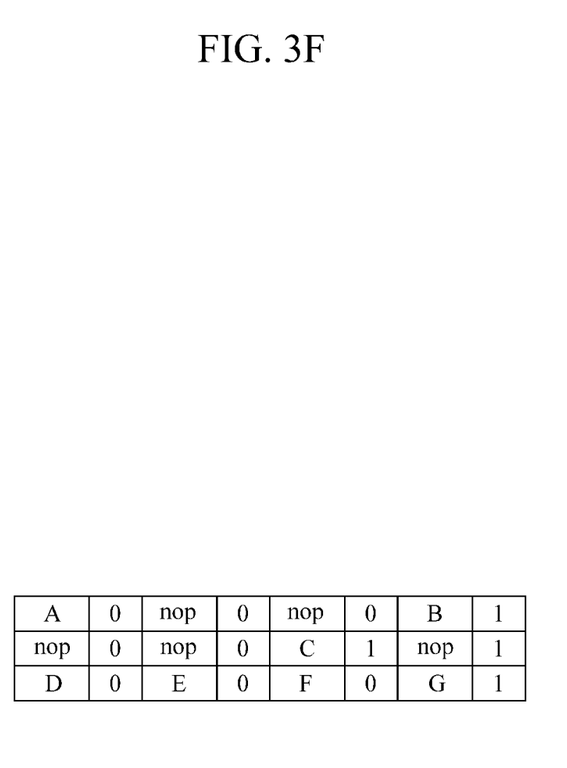

Referring to FIGS. 1, 3E, and 3F, the instruction compression apparatus 100 may delete the NOP instruction bundles. In this example, the instruction compression apparatus 100 deletes five NOP instruction bundles, thereby deleting a total twenty NOP instructions.

In the example of FIG. 3A-3F, as a result of the deletion of the NOP instructions, the processor only processes 3 bundles of instructions instead of 8 bundles of instructions.

In this example, the instruction compression apparatus 100 inserts instruction compression bits into valid instruction bundles and deletes NOP instruction bundles, thereby efficiently compressing instructions.

Figure 4:
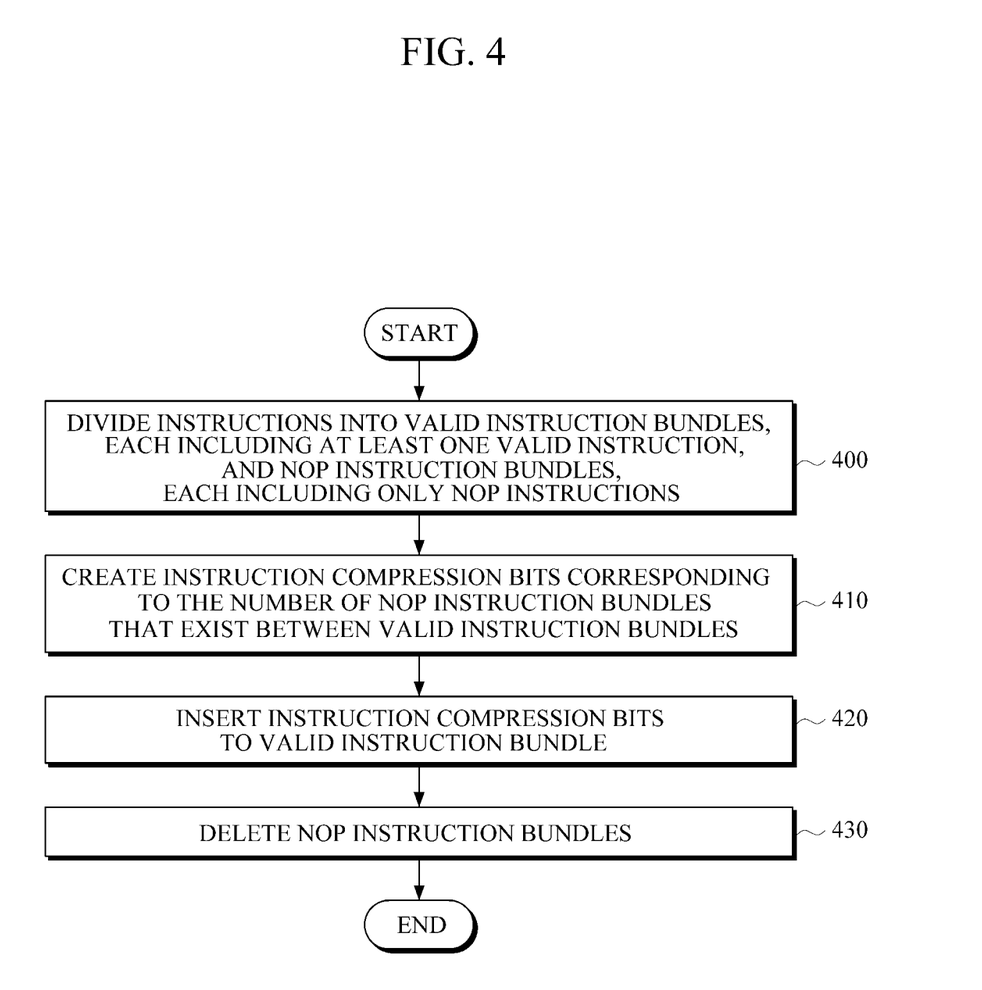
FIG. 4 is a flowchart illustrating an example of an instruction compression method.

FIG. 4 illustrates an example of an instruction compression method.

Referring to FIG. 4, an instruction compression apparatus, for example, apparatus 100 of FIG. 1, divides instructions into valid instruction bundles that each include at least one valid instruction, and NOP instruction bundles that each include only NOP instructions (400). For example, the instruction compression apparatus may group instructions into a plurality of instruction bundles and classify the instruction bundles into valid instruction bundles and NOP instruction bundles. The instruction compression apparatus creates instruction compression bits that correspond to the number of NOP instruction bundles that exist between valid instruction bundles (410). In this example, the number of the instruction compression bits may be equal to the number of instructions included in a valid instruction bundle.

The instruction compression apparatus inserts the instruction compression bits to the corresponding individual valid instruction bundles (420). For example, the instruction compression apparatus may add the instruction compression bits, bit-by-bit, to the individual instructions included in the corresponding valid instruction bundle, or to the beginning or end of the valid instruction bundle.

The instruction compression apparatus deletes the NOP instruction bundles (430). Accordingly, the instruction compression method may efficiently compress instructions by inserting instruction compression bits into valid instruction bundles and deleting NOP instruction bundles.

The instruction compression apparatus and method compress instructions in units of instruction bundles, thereby contributing to simplification of hardware for decompression, simplification of address calculation, and the like.

The instruction compression method and apparatus create and use instruction compression bits corresponding to the number of instructions, thereby minimizing the length of instructions. In various examples, an instruction compression bit may be inserted into each instruction included in a valid instruction bundle.

The instruction compression method and apparatus delete NOP instruction bundles, thereby effectively compressing instructions when latency between valid instruction bundles is long.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An instruction compression apparatus comprising:
a dividing unit configured to divide a plurality of instructions into a plurality of valid instruction bundles that each include at least one valid instruction, and a plurality of no operation (NOP) instruction bundles that each include at least one NOP instruction;
a creating unit configured to create instruction compression bits corresponding to the number of NOP instruction bundles that exist between a valid instruction bundle and a next valid instruction bundle; and
an inserting unit configured to insert the instruction compression bits into the valid instruction bundle.

2. The instruction compression apparatus of claim 1, wherein the amount of instruction compression bits is equal to the number of instructions included in the valid instruction bundle.

3. The instruction compression apparatus of claim 1, wherein the inserting unit is configured to add the instruction compression bits, bit-by-bit, to individual instructions included in the valid instruction bundle.

4. The instruction compression apparatus of claim 1, wherein the dividing unit is configured to group the plurality of instructions into a plurality of instruction bundles that each consist of instructions that are parallel-processed, and classify the instruction bundles into the valid instruction bundles and the NOP instruction bundles.

5. The instruction compression apparatus of claim 1, further comprising a deleting unit configured to delete the NOP instruction bundles.

6. The instruction compression apparatus of claim 1, wherein the valid instruction is an instruction for executing a predetermined operation, and the NOP instruction is an instruction for executing no operation.

7. An instruction compression method comprising:
dividing a plurality of instructions into a plurality of valid instruction bundles that each include at least one valid instruction, and a plurality of no operation (NOP) instruction bundles that each include at least one NOP instruction;
creating instruction compression bits corresponding to the number of NOP instruction bundles that exist between a valid instruction bundle and a next valid instruction bundle; and
inserting the instruction compression bits into the valid instruction bundle.

8. The instruction compression method of claim 7, wherein the amount of instruction compression bits is equal to the number of instructions included in the valid instruction bundle.

9. The instruction compression method of claim 7, wherein the inserting of the instruction compression bits comprises adding the instruction compression bits, bit-by-bit, to individual instructions included in the valid instruction bundle.

10. The instruction compression method of claim 7, wherein the dividing of the instructions comprises:
grouping the plurality of instructions into a plurality of instruction bundles that each consist of instructions that are parallel-processed; and
classifying the instruction bundles into the valid instruction bundles and the NOP instruction bundles.

11. The instruction compression method of claim 7, further comprising deleting the NOP instruction bundles.

12. The instruction compression method of claim 7, wherein the valid instruction is an instruction for executing a predetermined operation, and the NOP instruction is an instruction for executing no operation.

13. A computer-readable storage medium storing a program for executing an instruction compression method comprising:
dividing a plurality of instructions into a plurality of valid instruction bundles that each include at least one valid instruction, and a plurality of no operation (NOP) instruction bundles that each include at least one NOP instruction;
creating instruction compression bits corresponding to the number of NOP instruction bundles that exist between a valid instruction bundle and a next valid instruction bundle; and
inserting the instruction compression bits into the valid instruction bundle.

14. A processor that reduces an amount of instructions included in a plurality of instructions that are to be processed, the processor comprising:
an inserting unit configured to insert an instruction compression bit value into a valid instruction bundle, the instruction compression bit value corresponding to an amount of no operation NOP instruction bundles included between the valid instruction bundle and a next valid instruction bundle of the plurality of instructions; and
a deleting unit configured to delete the NOP instruction bundles from the plurality of instructions.

15. The processor of claim 14, wherein the inserting unit is configured to insert the instruction compression bit value at a beginning of the valid instruction bundle, an end of the valid instruction bundle, or in between individual instructions included in the valid instruction bundle.

16. The processor of claim 14, further comprising a plurality of processing units configured to process the plurality of instructions with the NOP instructions bundles removed.

17. The processor of claim 14, further comprising a dividing unit configured to divide the plurality of instructions into a plurality of valid instruction bundles that each include at least one valid instruction, and a plurality of no operation (NOP) instruction bundles that each include at least one NOP instruction.

18. The processor of claim 14, further comprising a creating unit configured to create the instruction compression bit value corresponding to the number of NOP instruction bundles that exist between the valid instruction bundle and the next valid instruction bundle.

* * * * *